Figure 1:
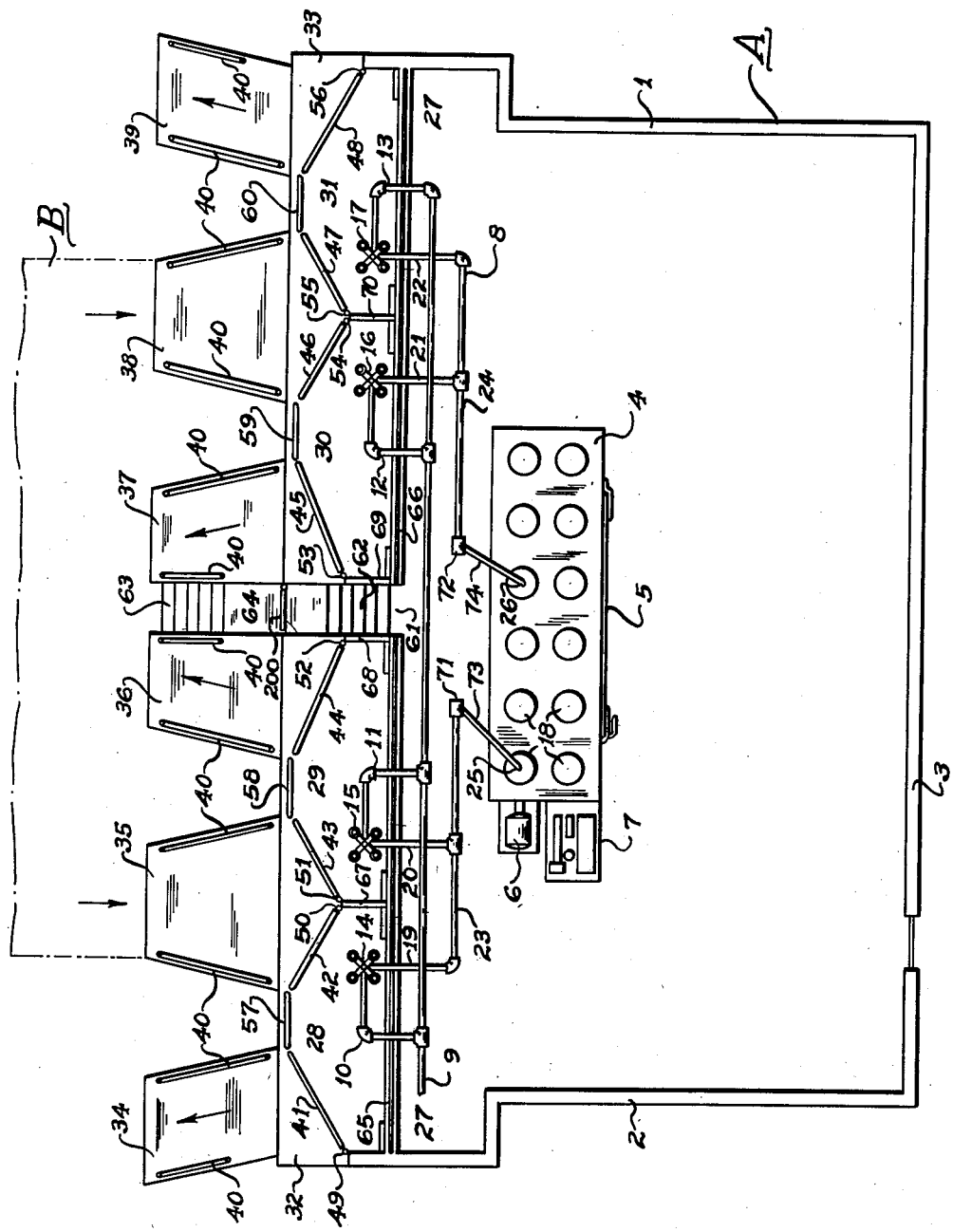

Nov. 11, 1952

G. R. DUNCAN 2,617,382

MILKING STRUCTURE

Filed Jan. 23, 1950

2 SHEETS—SHEET 1

INVENTOR,
George R. Duncan
BY
ATTORNEYS

INVENTOR,
George R. Duncan

Patented Nov. 11, 1952

2,617,382

UNITED STATES PATENT OFFICE 2,617,382

MILKING STRUCTURE

George R. Duncan, Washington, Mo.

Application January 23, 1950, Serial No. 139,994

3 Claims. (Cl. 119—14.03)

This invention relates to a means for milking farm animals such as cows or goats and is a further development of the structure disclosed in my application Serial No. 89,374, filed April 25, 1949, now Patent No. 2,512,094 granted June 20, 1950.

The principal object of the invention is to provide a sanitary milking structure with means for positioning the animals while being milked and for conducting the milk directly from the animals to a refrigerated container, the invention being particularly concerned with a farm structure whereby a plurality of pairs of animals may be positioned in a position for milking and where ready access may be had from the milking parlor to the enclosure for the animals. This enclosure may be either a barn, corral or even a larger enclosure such as a pasture where the animals are under semi-confinement and where they may be readily taken in charge and led to the place where the milking operation is conducted.

Another object of the invention is to provide a structure having provision for leading one or more farm animals to the milking station and providing means between the pairs of milking stations whereby ready access may be had by the attendant who is in charge of the milking operation or others to and from the enclosure where the animals are confined in numbers to the place where the teat cups may be adjusted for the individual farm animals.

A further object of the invention is to provide a building construction having a raised platform, a ramp for the animals to reach the raised platform and depart therefrom, and a walk way on a lower level for the attendant with communication means for connecting the walk way with the confined enclosure for the animals.

Yet another object of the invention is to provide a plurality of stalls, which are preferably elevated, a walk way for the attendant extending along side of said stalls, and an additional walk way connecting the first named walk way with an enclosure for farm animals.

Further objects will be described herein in the specification and illustrated in the drawing.

In the drawings, Figure 1 illustrates a plan view of the structure.

Figure 2:
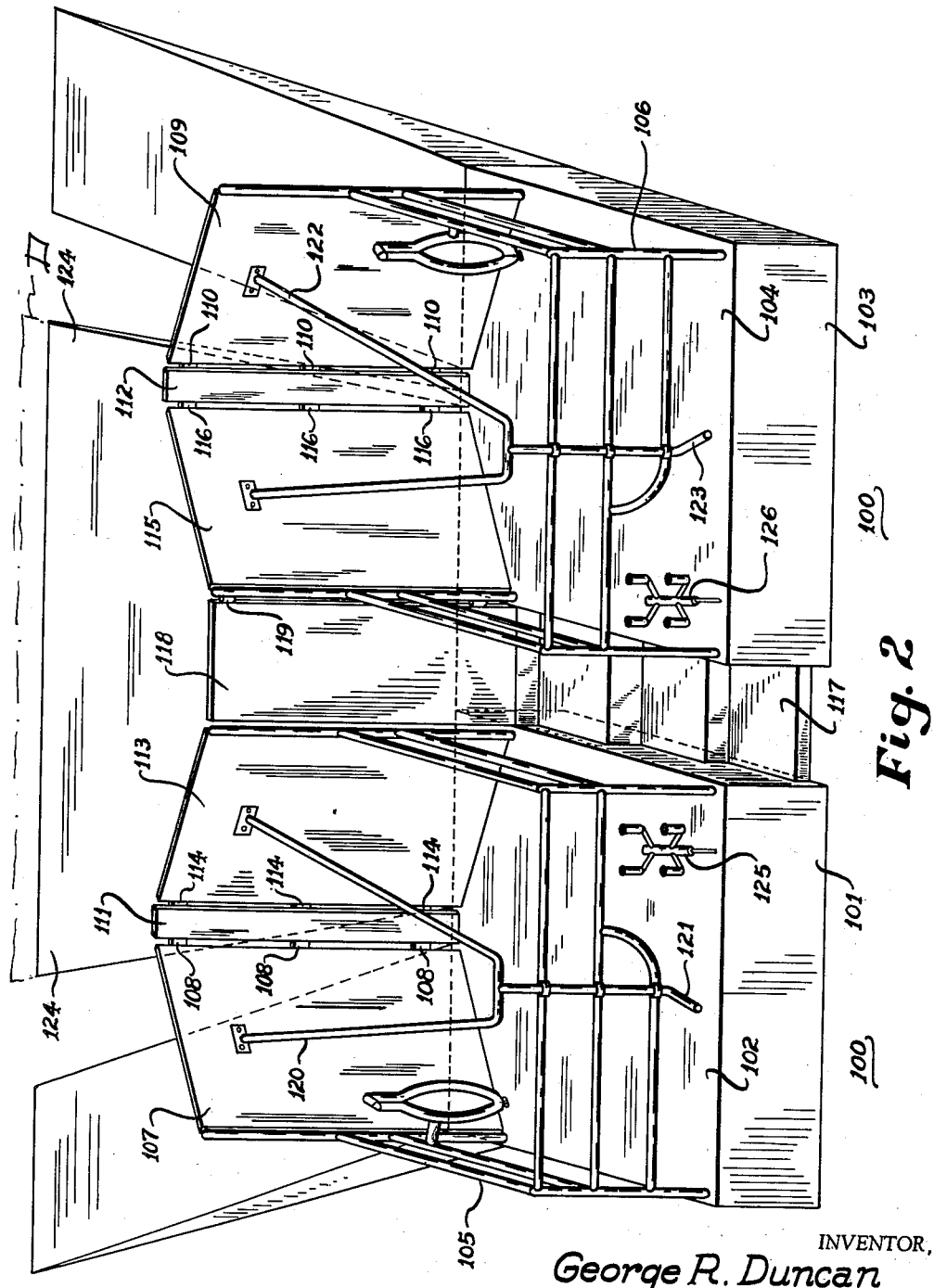

Figure 2 is a perspective view of a slightly modified structure.

Referring to Figure 1 of the drawings, the letter A designates the milk house and the letter B designates generally and in dotted lines an enclosure.

The exact structure of the milk house is of no particular importance but it may be provided with walls 1, 2, 3. Suitable doors and windows may be provided for the milk house.

Located within the milk house is a milk refrigerator having a side door 5 for access to the interior thereof. Mounted on the side of the refrigerator is an electric motor 6. This motor drives the mechanical refrigerating means shown generally at 7 but any suitable means such as the usual compressor, condenser structure now employed in mechanical refrigerators may be used. Any other suitable means may be provided for cooling the interior of the refrigerator 4. The refrigerator details may be similar or the same as those shown in other patents which have been issued to me on this subject and particularly that illustrated in my application Serial No. 89,375, filed April 25, 1949, now Patent No. 2,498,401 granted February 2, 1950.

A pipe system has been indicated generally by the numeral 8. This pipe system is an overhead pipe system and is connected to a milking machine, not shown, at 9, which milking machine may be of conventional type. The pipe system includes branch connections 10, 11, 12 and 13 leading to respective sets of teat cups 14, 15, 16 and 17.

The refrigerator 4 may be provided with a plurality of covers 18 that are located over the milk cans or other milk container means located in the refrigerator as shown in several of my prior patents. There are connecting pipes 19, 20, 21 and 22 which lead from respective sets of teat cups 14, 15, 16 and 17 respectively to the conduits 23 and 24 each of which is connected to a pair of connecting pipes and which lead through a plurality of the covers 18 through apertures 25 and 26.

All of the pipes of the pipe system indicated generally by the numeral 8 are located above the primary walk way or milker's station 27 which extends longitudinally of the stalls 28, 29, 30 and 31 so that the passage of an individual along this walk way or milker's station 27 is unimpeded. It will be understood that the arrangement of the pipes as shown is somewhat diagrammatic.

The stalls 28 to 31 inclusive form part of the elevated platforms 32 and 33 which are preferably on the same level. The inlet and exit ramps to the several stalls are indicated by the numerals 34, 35, 36, 37, 38 and 39. Suitable guide railings 40 are provided on the inlet and exit ramps.

There are a plurality of pivoted doors 41, 42, 43, 44, 45, 46, 47 and 48 which are pivoted on pivots 49, 50, 51, 52, 53, 54, 55 and 56, and there are fixed railings 57, 58, 59 and 60 on the elevated platform 32 and 33.

The animals are intended to be positioned so that they will be arranged back to back and that the attachment and removal of the pairs of teat cups may be readily attached and detached by the attendant working in the primary walk way 27.

There is a second walk way designated generally by the numeral 61. This secondary walk way may be on the same level with the primary walk way or milker's station 27 or steps may be provided as indicated at 62 and 63 in the figure and an elevated portion 64 which may be on the same or substantially the same level as the elevated level of the platforms 32 and 33. It will also be noted that the refrigerator 4 is located on the floor of the milk house A and this floor is on the same or substantially the same level as the primary walk way 27.

The sides of the respective stalls of each elevated platform 32 and 33, are preferably provided with suitable fence means 65, 66. The partition walls may extend to any suitable height.

It will be noted that the present invention as distinguished from my prior application, principally includes the combination set forth in the said application such as primary walk way or milker's station and stall arrangements, but in the present case there are a plurality of stalls arranged adjacent to each other which are separated from a second plurality of stalls arranged adjacent to each other, by a secondary walk way which connects the primary walk way to the enclosure for the animals.

In the present structure, the milking operation is greatly facilitated in that more animals may be milked at the same time, and as soon as the milking operation is completed with regard to one or more of the animals, the operator may readily detach the set of teat cups from that animal, open the door leading to the exit ramp, and drive in a second animal for that stall due to the fact that ready access is had by the operator from the primary walk way to the enclosure.

The numerals 68 and 69 indicate attaching means such as fencing to which the head of each animal may be attached during the milking operation.

The numeral 200 is a door for the secondary walk way.

Referring to the modified form shown in Figure 2, the numeral 100 designates the floor level used as a walk way for one or more operators. In the construction shown in this figure there is provision for a single animal on either side of the secondary walk way.

The numeral 101 is the vertical wall of the raised floor 102, and 103 is a vertical wall of the raised floor 104.

There is a fence or enclosure 105 for floor 102 and a fence or enclosure 106 for floor 104.

The raised floor 102 is provided with an exit door 107 pivoted at 108, and the raised floor 104 is provided with a pivoted exit door 109 which swings on pivot 110.

The numerals 111 and 112 indicate the vertical partitions which are stationary and which may be of any suitable width, as may be the doors which have been and which will be described hereinafter.

The stall that has raised floor 102 is provided with an inlet door 113 pivoted at 114 to partition 111, and the stall having floor 104 is provided with an inlet door 115 pivoted at 116 to partition 112.

Between the two stalls as defined above, there is a secondary walk way 117 which may or may not be provided with steps as shown. However, an important feature of this construction is the "man"-door 118, as distinguished from the "animal"-door heretofore described. This door 118 is pivoted at 119 so that ready access may be had to an enclosure similar to the enclosure B shown in Figure 1.

Linkage 120 operated by a suitable handle 121 and linkage 122 operated by handle 123 is diagrammatically illustrated in Figure 2. Operation of the handle 121 will swing both doors 107 and 113 from their closed position as illustrated to their open position in order that the animal in the milking stall whose limitations are generally defined by floor 102 may leave the stall through the left hand ramp, and an unmilked animal may enter through the door 113 by way of the ramp 124. The same operation may be performed with regard to the right hand stall, the operator merely turning the handle 123 to open both doors 115 and 109 so as to admit an animal through door 115 and permit the animal which has been milked to leave through open door 109.

There is a suitable stanchion means attached to the extreme left and right portions of the fences 105 and 106 respectively, in order that the animals may be secured facing away from each other during the milking operation, and the numerals 125 and 126 indicate sets of teat cups to be used for milking purposes. The piping system including the vacuum and milk pipes have not been illustrated in the present invention because these are of conventional type.

The dot and dash lines indicate the fence or enclosure D.

The foregoing description of the invention is explanatory thereof and various changes in the size, shape or materials used as well as in the details of the illustrated construction may be made, within the scope of the appended claims, without departing from the spirit of the invention.

I claim:

1. In a structure for milking farm animals and for conveying the milk to milk container means as it comes from the animals comprising a pair of raised platforms having thereon means defining at least one pair of stalls on each platform for positioning a pair of farm animals with their posteriors adjacent and their udders in close proximity to each other, mechanical milking means including at least two sets of teat cups located in close proximity to each other adjacent the stalls whereby each set may be readily attached for milking the said pair of farm animals, a mechanical refrigerator having front, back and side walls, said refrigerator being adapted to support the milk container means, said mechanical milking means further including a milk line means connected to each set of teat cups and leading into said refrigerator for connection to the milk container means located within said refrigerator and means defining a milker's station between one of said refrigerator walls and said platforms, said milker's station extending longitudinally of said platforms, and a walkway located between said platforms.

2. In a structure for milking farm animals and for conveying the milk to milk container means as it comes from the animals comprising a pair of raised platforms having thereon means defining at least one pair of stalls on each platform for positioning a pair of farm animals with their posteriors adjacent and their udders in close proximity to each other, mechanical milking means including at least two sets of teat cups located in close proximity to each other adjacent the stalls whereby each set may be readily attached for milking the said pair of farm animals, a mechanical refrigerator having front, back and side walls, said refrigerator being adapted to support the milk container means, said mechanical milking means further including a milk line means connected to each set of teat cups and leading into said refrigerator for connection to the milk container means located within said refrigerator, means defining a milker's station between one of said refrigerator walls and said platforms, said milker's station extending longitudinally of said platforms, and ramp means connected to said platforms and a walkway located between said platforms.

3. In a structure for milking farm animals and for conveying the milk to milk container means as it comes from the animals comprising a pair of raised platforms having thereon means defining at least one pair of stalls on each platform for positioning a pair of farm animals with their posteriors adjacent and their udders in close proximity to each other, mechanical milking means including at least two sets of teat cups located in close proximity to each other adjacent the stalls whereby each set may be readily attached for milking the said pair of farm animals, a mechanical refrigerator having front, back and side walls, said refrigerator being adapted to support the milk container means, said mechanical milking means further including a milk line means connected to each set of teat cups and leading into said refrigerator for connection to the milk container means located within said refrigerator, means defining a milker's station between one of said refrigerator walls and said platforms, said milker's station extending longitudinally of said platforms, and a plurality of ramps connected to said platforms at spaced intervals along the length thereof and a walkway located between said platforms.

GEORGE R. DUNCAN.

REFERENCES CITED

The following references are of record in the file of this patent:

UNITED STATES PATENTS

| Number | Name | Date |
|---|---|---|
| 942,884 | Buckwalter | Dec. 14, 1909 |
| 1,863,603 | Marshall, Jr. | June 21, 1932 |
| 1,928,819 | Neller | Oct. 3, 1933 |
| 1,981,418 | Kreutzer | Nov. 20, 1934 |
| 2,472,122 | Polivka | June 7, 1949 |

FOREIGN PATENTS

| Number | Country | Date |
|---|---|---|
| 10,734 | Great Britain | 1908 |
| 14,887 | Great Britain | 1908 |
| 347,320 | Great Britain | Apr. 30, 1931 |

OTHER REFERENCES

Farm Implement and Machinery Review, Nov. 1, 1946, pages 645 and 646.

Farm Building Construction Book, No. 116, page 65, March 1949.